(12) United States Patent
Hempelmann et al.

(10) Patent No.: US 11,237,911 B2
(45) Date of Patent: Feb. 1, 2022

(54) OBJECT STORE FOR DATABASE BACKUPS

(71) Applicant: SAP SE, Walldorf (DE)

(72) Inventors: Henrik Hempelmann, Havelberg (DE); Martin Brunzema, Berlin (DE); Robin Wissbrock, Berlin (DE); Stefan Voss, Potsdam (DE); Andre Schefe, Berlin (DE)

(73) Assignee: SAP SE, Walldorf (DE)

( * ) Notice: Subject to any disclaimer, the term of this patent is extended or adjusted under 35 U.S.C. 154(b) by 350 days.

(21) Appl. No.: 15/926,310

(22) Filed: Mar. 20, 2018

(65) Prior Publication Data
US 2019/0294505 A1    Sep. 26, 2019

(51) Int. Cl.
*G06F 16/21* (2019.01)
*G06F 11/14* (2006.01)
*H04L 29/08* (2006.01)
*G06F 16/23* (2019.01)

(52) U.S. Cl.
CPC ...... *G06F 11/1448* (2013.01); *G06F 11/1464* (2013.01); *G06F 16/21* (2019.01); *G06F 16/23* (2019.01); *H04L 67/16* (2013.01)

(58) Field of Classification Search
CPC ........... G06F 11/1448; G06F 17/30289; G06F 11/1464; G06F 17/30345; H04L 67/16
USPC ...................................................... 707/640
See application file for complete search history.

(56) References Cited

U.S. PATENT DOCUMENTS

| | | | |
|---|---|---|---|
| 7,133,983 B2 * | 11/2006 | Bartfai | G06F 12/0826 |
| | | | 711/161 |
| 7,440,979 B2 | 10/2008 | Strahl et al. | |
| 7,467,413 B2 | 12/2008 | Mensing et al. | |
| 7,480,672 B2 | 1/2009 | Hahn et al. | |
| 7,519,636 B2 | 4/2009 | Strahl et al. | |
| 7,693,883 B2 | 4/2010 | Hempelmann et al. | |
| 7,778,972 B1 * | 8/2010 | Cormie | G06F 3/067 |
| | | | 707/626 |
| 7,890,456 B2 | 2/2011 | Hempelmann et al. | |
| 7,974,943 B2 * | 7/2011 | Gilbert | G06F 16/27 |
| | | | 707/610 |
| 8,386,431 B2 | 2/2013 | Hahn et al. | |
| 8,484,464 B2 * | 7/2013 | Brown | H04L 9/16 |
| | | | 713/165 |

(Continued)

*Primary Examiner* — Hosain T Alam
*Assistant Examiner* — Robert F May
(74) *Attorney, Agent, or Firm* — Fish & Richardson P.C.

(57) ABSTRACT

The disclosure generally describes methods, software, and systems for performing automatic backups to the cloud. Application code in a database system updates rows and columns in the database for an updated object, and automatically performs a backup of database information to the cloud. Performing the backup includes directly executing a REST call to the cloud storage solution to which the backup of the database information is performed. Performing the backup includes: sending a request, using a REST call, to create a new object in the cloud storage solution; in response to receiving an acknowledgement of a successful creation of the new object, sending, to the cloud storage solution, REST PUT calls that include contents of the object for the cloud storage solution to store into the created new object; receiving, from the cloud storage solution, a specific key identifying the backup; and locally storing the specific key.

20 Claims, 7 Drawing Sheets

(56) References Cited

U.S. PATENT DOCUMENTS

| | | | |
|---|---|---|---|
| 8,793,288 B2 | 7/2014 | Hempelmann et al. | |
| 8,849,825 B1* | 9/2014 | McHugh | G06F 16/2255 |
| | | | 707/737 |
| 9,110,601 B2 | 8/2015 | Vorsprach et al. | |
| 9,110,847 B2 | 8/2015 | Schefe et al. | |
| 9,280,331 B2 | 3/2016 | Arnold et al. | |
| 9,619,506 B2 | 4/2017 | Schefe et al. | |
| 9,639,439 B2* | 5/2017 | Laicher | H04L 67/1095 |
| 9,740,576 B2 | 8/2017 | Schefe et al. | |
| 9,766,984 B2 | 9/2017 | Schefe et al. | |
| 9,785,516 B2 | 10/2017 | Schefe et al. | |
| 9,836,360 B2 | 12/2017 | Schefe et al. | |
| 10,152,499 B1* | 12/2018 | Wilton | G06F 11/1451 |
| 10,430,293 B1* | 10/2019 | Skowronski | G06F 11/1448 |
| 2007/0043733 A1* | 2/2007 | Cannon | G06F 16/10 |
| 2012/0254111 A1* | 10/2012 | Carmichael | G06F 16/134 |
| | | | 707/627 |
| 2014/0149794 A1* | 5/2014 | Shetty | H04L 67/1095 |
| | | | 714/20 |
| 2014/0201486 A1* | 7/2014 | Zhu | G06F 3/065 |
| | | | 711/162 |
| 2015/0161012 A1* | 6/2015 | Meier | G06F 11/1469 |
| | | | 707/649 |
| 2015/0324386 A1* | 11/2015 | Calder | H04L 67/1097 |
| | | | 707/649 |
| 2016/0117226 A1* | 4/2016 | Hetrick | G06F 11/1451 |
| | | | 711/162 |
| 2016/0371319 A1* | 12/2016 | Park | G06F 16/951 |
| 2017/0091047 A1* | 3/2017 | Bangalore | G06F 11/1461 |
| 2017/0118095 A1* | 4/2017 | Konecny | H04L 67/10 |
| 2017/0255401 A1* | 9/2017 | Basham | G06F 3/0619 |
| 2018/0253359 A1* | 9/2018 | Zhang | G06F 11/1464 |

\* cited by examiner

OBJECT STORE FOR DATABASE BACKUPS

BACKGROUND

The present disclosure relates to data backups. For example, conventional systems can perform backups of local data by copying the data to local storage. The backup can serve as a copy of the data in case the data needs to be recovered. Conventional backups that are made to local storage can be expensive due to storage costs. Some solutions use a local file system for their backups and, at a later time, move the file backups to the cloud using various tools.

SUMMARY

This disclosure generally describes computer-implemented methods, software, and systems for performing backups. One computer-implemented method includes: receiving, at a database system, an update to an object in a database managed by the database system; updating, by application code in the database system and using the received update, rows and columns in the database for the updated object; and automatically performing, by the application code in the database system and based at least on the applicable rows and columns, a backup of database information to a cloud storage solution, the backup including at least the updated object, wherein automatically performing the backup includes directly executing, by the database system, a REpresentational State Transfer (REST) call to the cloud storage solution to which the backup of the database information is performed, wherein performing the backup includes: sending a request, using a REST call, to create a new object in the cloud storage solution; in response to receiving an acknowledgement of a successful creation of the new object, sending, to the cloud storage solution, REST PUT calls that include contents of the object for the cloud storage solution to store into the created new object; receiving, from the cloud storage solution, a specific key identifying the backup; and locally storing the specific key.

The foregoing and other implementations can each optionally include one or more of the following features, alone or in combination. In particular, one implementation can include all the following features:

In a first aspect, combinable with any of the previous aspects, the method further comprises: performing, by the database system, a recovery of the backed-up information, the performing comprising: identifying a recovery need or request for the backed-up information; in response to identifying the recovery need or request, identifying an identifier associated with the backed-up information; providing, to the cloud storage solution and using a REST call, a request for the backed-up information, the request including the identifier associated with the backed-up information; receiving, from the cloud storage solution in a response to the request, the backup of the database information; and updating the database system using the received response.

In a second aspect, combinable with any of the previous aspects, wherein performing the backup comprises: dividing the database object into portions that are operable to be processed in parallel; and directly executing, by the database system and in parallel for each particular portion of database object, a REST call to the cloud storage solution for the particular portion of the databased object.

In a third aspect, combinable with any of the previous aspects, the method further comprising receiving, from the cloud storage solution upon a successful backup at the cloud storage solution, a key that uniquely identifies the backup.

In a fourth aspect, combinable with any of the previous aspects, the method further comprising: storing the unique key by the database system in the database, wherein storing the unique key includes storing a name and an entity tag (ETag).

In a fifth aspect, combinable with any of the previous aspects, wherein the database system is an in-memory database system.

In a sixth aspect, combinable with any of the previous aspects, wherein the request specifies a particular ETag of a dataset to be restored.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

This disclosure generally describes computer-implemented methods, software, and systems for performing automatic backups to the cloud.

Traditional database management systems typically use files in a file system of an underlying operating system to store a redundant copy of the database management system's data for backup purposes. For example, the content of the database management system is copied into one or multiple files upon user request or at a defined interval. Additionally, a transaction log of the database management system is copied into backup files on demand or as a file size (or a number of transactions) reaches a defined threshold. The data and log backup files are stored on local disk volumes of the host running the database management system or on volumes attached from remote storage entities. Backup technologies that are used can include, for example, network file system (NFS), fiber channel, network attached storage (NAS), and storage area network (SAN).

Besides storing backups in the file system, some systems are also capable of transferring their backup data using a BACKINT interface to external storage providers, such as to run full and incremental backups. In this scenario, the backup data is not written directly into files in the file systems but into named pipes resembling a similar interface. The pipes facilitate the transfer of the backup payload to an external storage system, where the data backup will be stored, as well, in files on disk or even files streamed to tape drives or other media for long-term storage.

This disclosure describes techniques for storing backup data directly into an object store usually found in cloud-based system landscapes. An object store does not resemble the traditional file interface, but defines a method to store an arbitrary amount of data as a key-value pair. In some implementations, a database server can connect to common implementations of cloud-based object stores such as Amazon Web Services (AWS) (object storage service Simple Storage Solution (S3)), Microsoft's Azure Blob Storage, or Google Cloud Storage via a Hypertext Transfer Protocol (HTTP)-based REpresentational State Transfer (REST) network protocol. Backups can be stored into and retrieved from object stores identified by the object key provided by the database management system.

Instead of opening a file in the local file system, a new object container can be created via a network call implementing a REST application programming interface (API) of the object store. A second REST request can send the backup data to the object store where it will be persisted. A unique key identifying the backup data can be stored in the backup catalog of the database management system, which may be similar to techniques used for file names or BACKINT backup IDs in existing implementations.

During a recovery, the database management system can request the backups by issuing a GET request associated with the unique key identifying the backup object. The content of the GET response can contain the actual backup to be streamed into the database management system for processing during the recovery operation.

As the object store service is globally accessible and not directly bound to the database instance, the database can specify a connection uniform resource locator (URL), access credentials, and other attributes while accessing the object store.

The actual implementation of the object store interface can be directly linked to the service process that handles a data volume. Alternative implementations can handle the object store protocol in a separate proxy process connected to the database management system by the traditional BACKINT protocol.

With a traditional approach of files written to the file system, a second step is typically required to move the resulting files into long-term storage such as a cloud-based object store. This additional step has to be scheduled in sync with the backup operation itself, which might be complicated and error prone. Recovery and housekeeping of the backup files can be a two-step approach as well. A disadvantage of traditional approaches is that inadvertent or accidental deletion of files can occur on the long-term storage, and full recoveries are still required.

However, using the techniques described in the present disclosure, direct access of a database engine of the database management system to the cloud-based object store, the management of the backup files means that the backed-up data is always under the control of the database management system. In this way, the database management system is able to selectively restore from specific backups, and backups that are no longer needed can be deleted.

The techniques described in this disclosure can provide many advantages. First, backups can occur automatically using calls made at the database level to backup data to the cloud. Second, backups can occur without the need for a staging area, meaning that the data is copied only once. Third, a backup/recovery total cost of operation (TCO) of a database engine can be significantly reduced. Fourth, the overall system is more robust and reliable. Fifth, backup and recovery times can be reduced. Sixth, disaster recovery or system copy to another database system can be done using the same object-store interface, reducing the time and increasing the reliability for such scenarios.

In order to simplify the process of backing up data to the cloud, REST calls can be implemented at a lowest possible level in a database. A REST call can be a direct call to a cloud service that stores data in the cloud. The cloud service can receive backups and, at a later time, can provide copies of the backed-up data. Copies of the backed-up data can be used for restoring data that has been lost or corrupted at the database since the last backup, or for reverting to a selected version of a database. A request to the cloud service can include an identifier (ID) that identifies the data included in backup that occurred at an earlier time. In addition to using REST calls, other implementations are possible for initiating backups, such as using Simple Object Access Protocol (SOAP) calls.

REST calls can include calls for various operations. A POST call, for example, can have a create/read/update/delete (CRUD) equivalent of a create command, such as to create an object in the cloud storage solution. A GET can be used to obtain data from the cloud storage solution, such as to obtain data that has been backed up. A PUT can be used to send data to the cloud storage solution, such as to provide data that is to be backed up.

Backups can occur at various times, such as by using one or more of scheduled daily, weekly, or monthly backups. Backup periods can be tied to a fiscal year, a calendar year, a business cycle, a version of a system or application, or any other time period or as needed to meet backup needs. Backups can support database recovery procedures, including disaster recover, such as if entire datasets are lost due to fire, flooding, or any other disaster. Backups can be used to back up entire objects or entire data sets, or for delta backups that include changes since a previous backup.

Backups can be implemented by sending data to a cloud service in the form of objects. Each object can include arbitrary strings of data which is known to the database that initiates the backup. However, to the cloud service, the data can appear as being random. The cloud service can store the objects in object containers in the cloud. In some implementations, the cloud service can implement the backup by storing key-value pairs.

In some implementations, backups and restores can require the specification of a connection URL, access credentials, and other attributes. In this way, authentication verification can be performed at the cloud server before the data is provided in response to a request (such as for a restore). In some implementations, encryption can be used in order to provide added security to data that is sent to, or received from, the cloud server.

Figure 1:
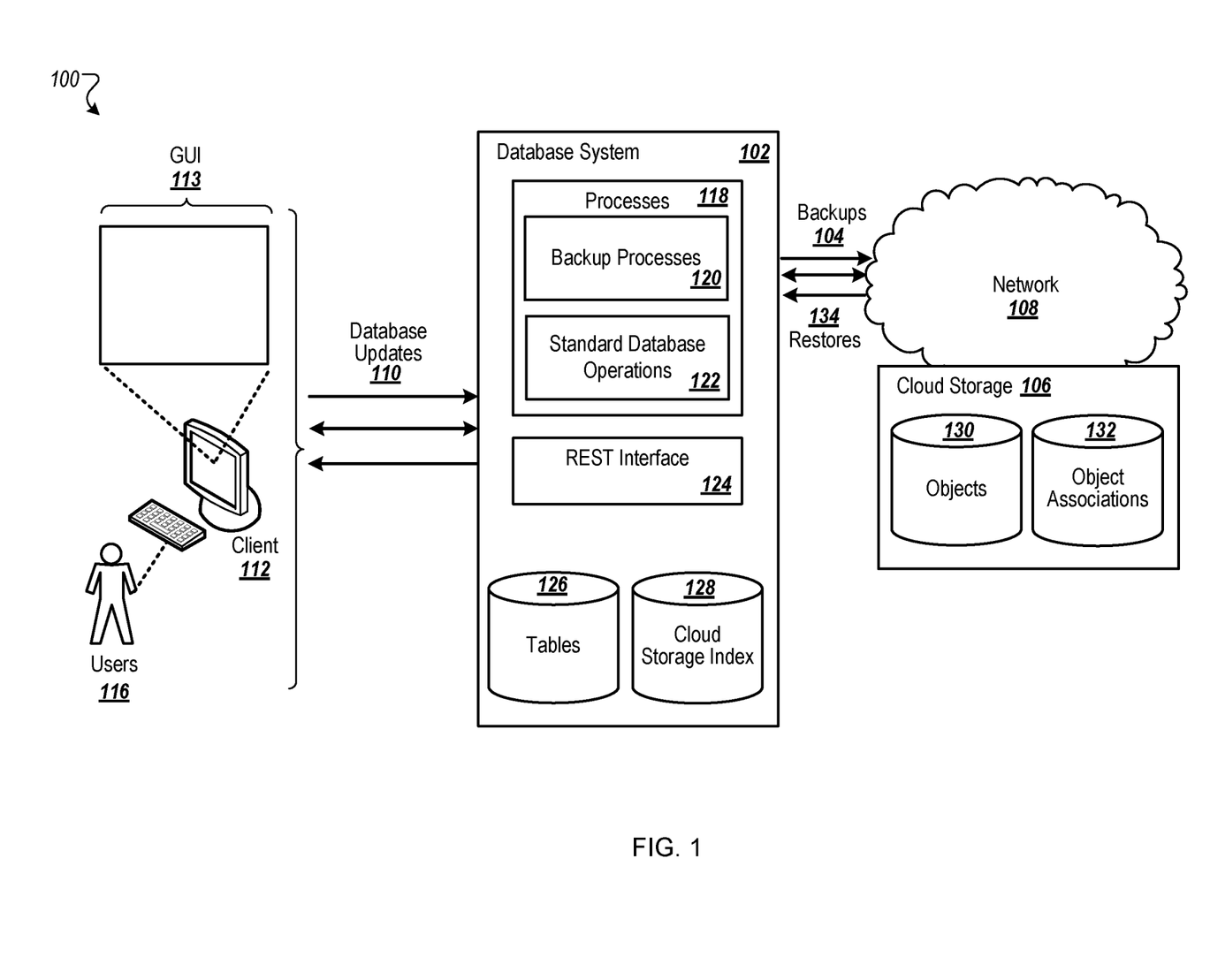
FIG. 1 is a block diagram of an example environment for performing automatic backups to the cloud.

FIG. 1 is a block diagram of an example environment 100 for performing automatic backups to the cloud. The environment 100 includes a database system 102 for performing automatic backups 104 to cloud storage 106. The backups can be completed through a network 108. The network 108 includes at least the Internet, but can also include local area networks (LANs), wide area networks (WANs), and other networks.

The database system 102 can be an in-memory database system that provides multiple services for storing and retrieving data. For example, the database system 102 can be part of an enterprise resource planning (ERP) and data management program. Backups can be implemented, for example, using REST calls that are configured to automatically execute from application code at the database level. There can be many services that are included in the database system 102, and, in some instances, each service can be responsible for backing up its own data objects (or "objects"). Example services can include servers such as index servers and other servers that store, and provide access to, one or more objects. Using the present solution, each service is able to launch its own backups 104.

In one example of a backup 104 for a given object, information included with the backup 104 can include a token that uniquely identifies the name of the object being backed up. Each backup 104 can also identify a version ID that identifies, for example, the version of the database being backed up. In some implementations, multiple objects can have the same key. In this scenario, the object store does not overwrite the object with new content but stores both versions of the keyed object. The object store can also return a unique version identifier for each object. The token that identifies the object can include a data prefix, such as a data prefix that differentiates object as Object X versus Object Y. The backup 104 can include or identify a file name prefix that can include a current date and time, a version number, or some other file information. Protocol information that is included in each backup 104 can define a storage location, the site of the backup object, and the actual data to be backed up. In some implementations, unique identification of a backup (that is generated by the cloud server) can include an external backup ID (EBID), an object name, and a local database ID or a database name of the database. A response (that is generated by the cloud server) to a successful backup can include a status indicator, a date/timestamp, and a content ID.

Backups 104 can serve as backups of information that includes database updates 110 received from one or more clients 112. The database updates 110 can include additions, modifications, and deletions, such as information stored to the ERP and data management program. In some implementations, database updates 110 can include commands for creating new tables in the database system 102, which can also trigger backups 104 (or other requests) that include instructions for establishing an initiation of objects (or definitions thereof) in the cloud storage 106.

Clients 112 can include a combination of hardware (such as computers, including laptops, personal computers, smartphones, or other client devices) and applications (such as applications hosted on computers, websites, and other hosts). The clients 112 can be used by users 116, administrators, developers, and end users. Clients 112 can also include computers and applications, including embedded systems and batch processes, that do not interact with users, but that access and/or interact with the objects and/or other systems. The clients 112 can provide a graphical user interface (GUI) 113 for presenting information to the users 116.

The database system 102 includes various processes 118 for completing database-related operations and functions. The processes 118 can include backup processes 120 and standard database operations 122. As an example, for a database update 110 such as an added record, the standard database operations 122 can include operations to update one or more rows in tables 126 under the control of the database system 102. The tables can include, for example, relational database management (RDBMS) tables, but can also include other tables or structures for storing data. In addition to the standard database operations 122 that are performed by the database system 102, the backup processes 120 corresponding to the added record can be performed automatically. The automatic backups can occur, for example, using pre-coded REST calls launched by the backup processes 120. The REST calls can pass through (or be handled by) a REST interface that formulates the necessary information needed to send the backups 104 to the cloud storage 106. Backups 104 can also occur for non-RDBMS data, such as images, flat files, or any other data that can be backed up.

A cloud storage index 128 that is resident in and/or remotely accessible to the database system 102 can be used to keep track of data that has been updated in the cloud storage 106. The information can include names or identities of what is stored in the cloud storage 106 and data-specific information that includes, for example, an entity tag (ETag) or an EBID corresponding to the backup. The information can also identify volume information (for example, a numeric value identifying the data volume to which the backup pertains) and timestamp information (for example, a date and time at which the backup was performed). A database catalog can store information that identifies which index server (or volume) the data for each table is stored. A backup catalog can store information identifying which volumes were backed up, including timestamp, EBID, prefix name, and other information.

The cloud storage 106 can include objects 130, where each object 130 corresponds to one backup of an index server. The objects 130 can also serve as a source for data that is replicated to various systems. Object associations 132 can define associations that exist between entries in the objects 130.

The objects 130 can be accessed by the database system 102 in order to perform restores 134, such as to recover data that has been lost or corrupted in the tables 126. Restores 134 can occur, for example, when the database system 102 requests particular data for a given date. Identification of data to be restored can include the database system 102 specifying particular ETag or the EBID of a dataset to be restored. Data restores 134 can occur for all or part of the backed up data that corresponds to the ETag or the EBID.

In some implementations, a database system other than the database system 102 can access the cloud storage 106 and obtain a copy of stored objects. For example, the cloud storage 106 can serve as a replication source for specific data in the database system 102. Replication can be used, for example, to provide a copy of information for a site similar to the site at which the database system 102 is located. For example, if the database system 102 includes data for a restaurant chain, one or more datasets from the objects 130 can be used as a restore 134 in order to populate data of a database system at a new brick-and-mortar location in the restaurant chain.

Figure 2:
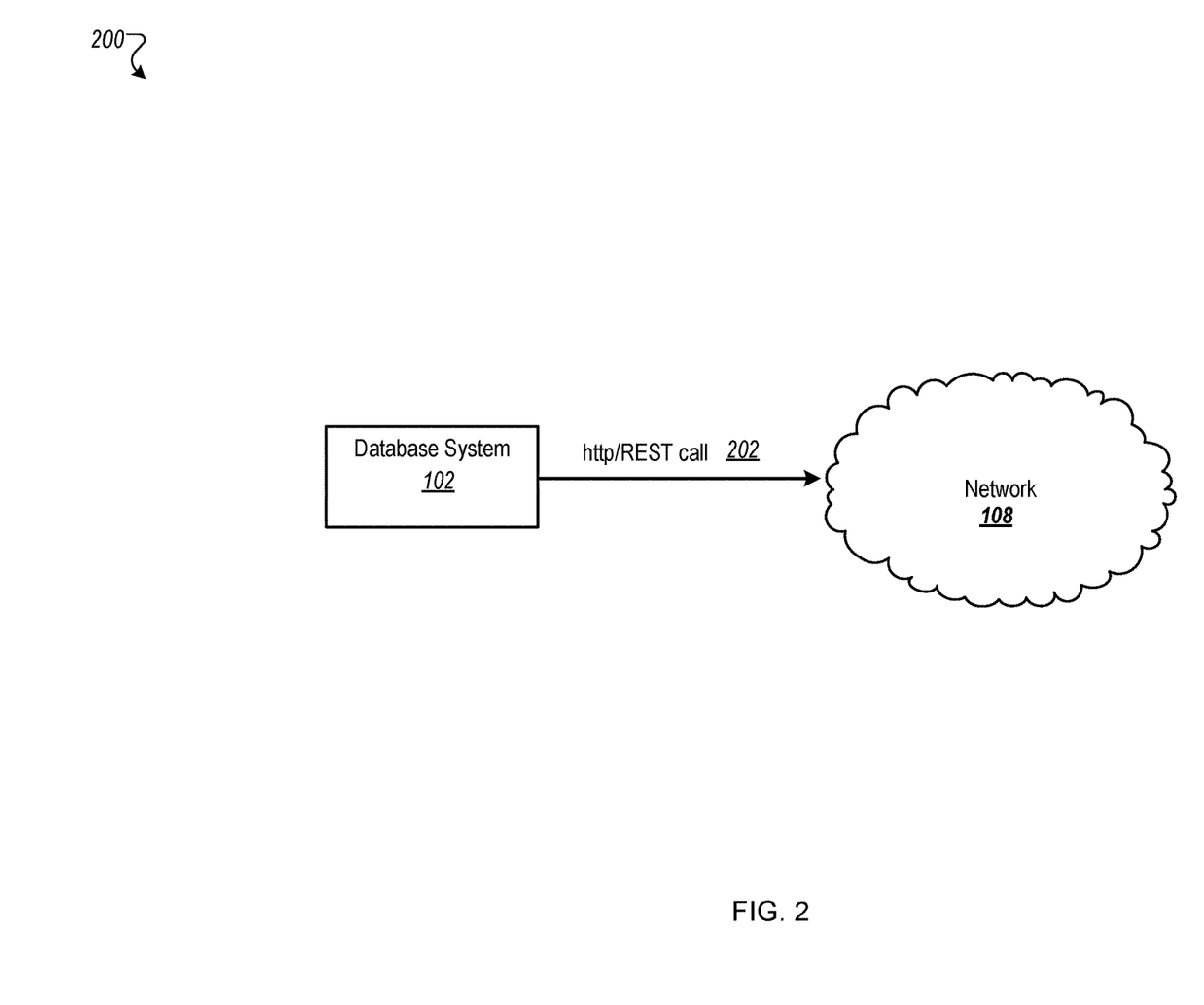
FIG. 2 is a block diagram showing an example of a call made from a database system to a network.

FIG. 2 is a block diagram showing an example of a call 200 made from a database system to a network. For example, the call 200 can include an HTTP or REST call 202 made from the database system 102, such as through the REST interface 124. The call 200 is depicted in FIG. 2 as being sent to the network 108, when where the call 200 can be received by the cloud storage 106. In some implementations, the cloud storage 106 is a publicly available cloud storage solution, offering customers storage of, and access to, their cloud-stored data. The access can include, for example, the backup and recovery functions described with reference to FIG. 1

Figure 3:
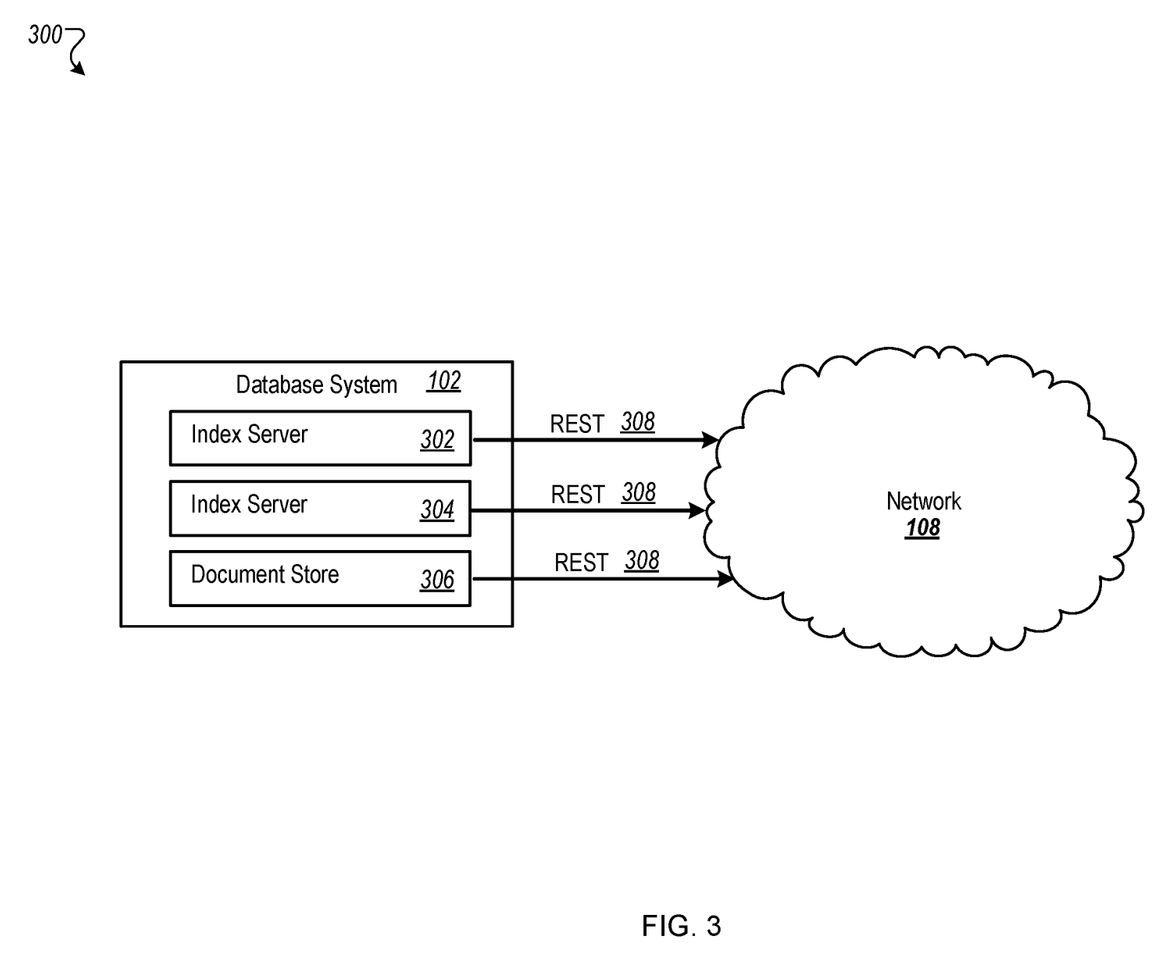
FIG. 3 is a block diagram showing example detail of the database system.

FIG. 3 is a block diagram showing example detail of the database system 102. For example, the database system 102 can include index servers 302 and 304, associated with RDBMS functions, that can make REST calls 308 in order to back up RDBMS table data to the cloud (through the network 108). A document store 306, such as a data store that does not include RDBMS data, can also make REST calls 308 to create backups in the cloud.

Figure 4:
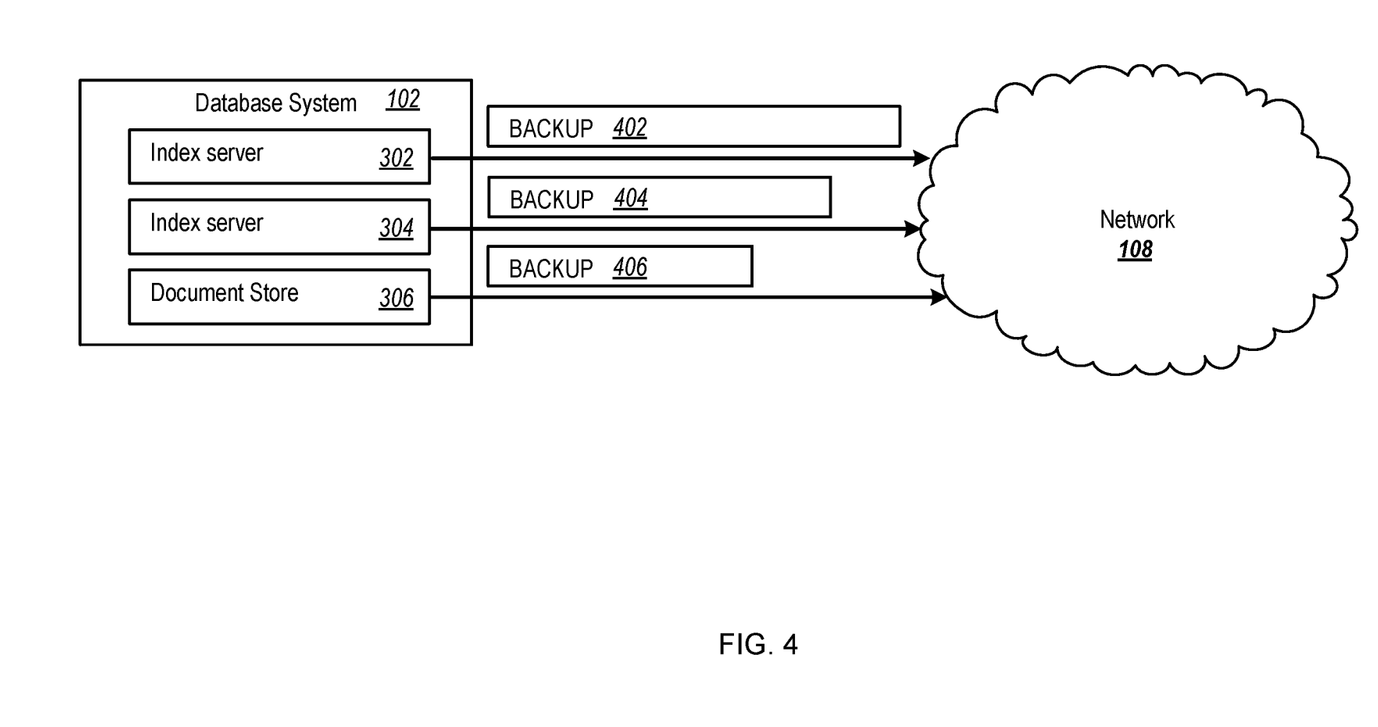
FIG. 4 is a block diagram showing example varying sizes of data packets that are to be backed up.

FIG. 4 is a block diagram showing example varying sizes of data packets that are to be backed up. For example, backups 402-406 have different amounts/sizes of data that are to be backed up, with the backup 402 having the greatest amount of data and the backup 406 having the least amount of data. In some implementations, data that is to be backed can be divided into a group of backups that can be executed in parallel.

Figure 5:
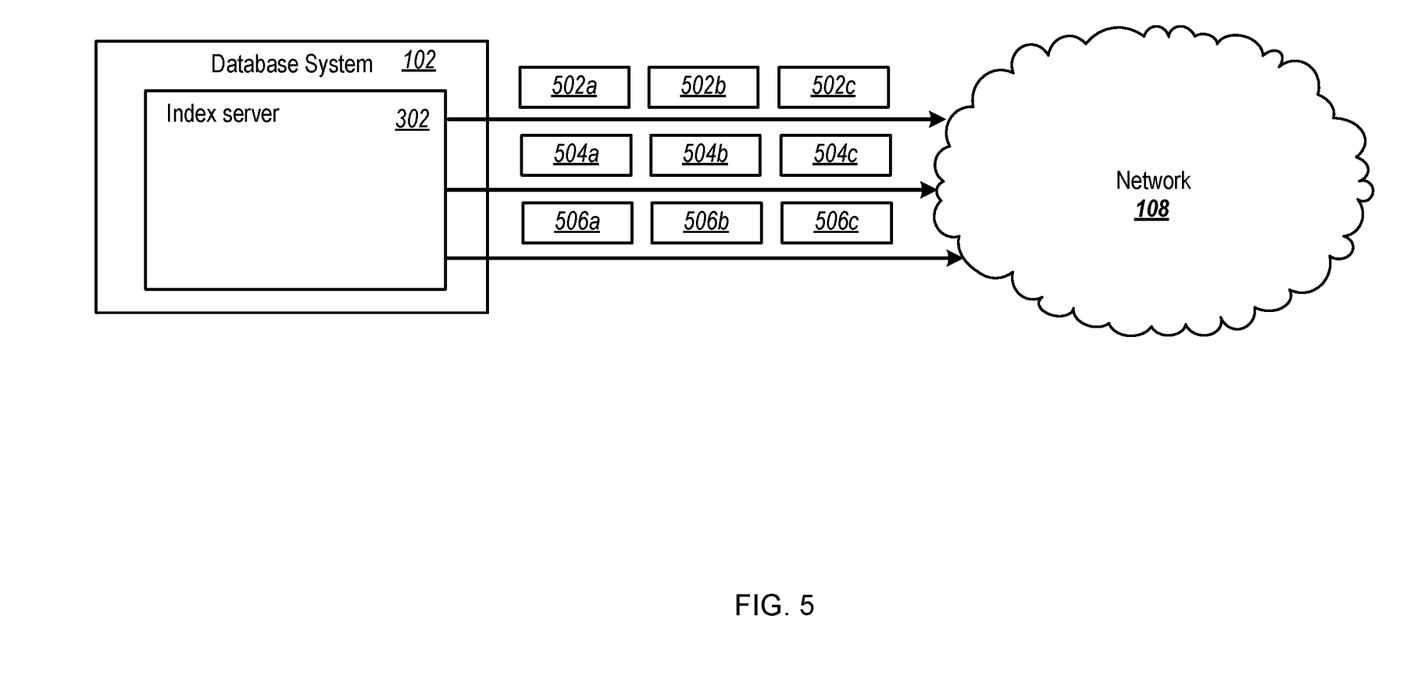
FIG. 5 is a block diagram showing an example set of individual data packets from a same backup.

FIG. 5 is a block diagram showing an example set of individual data packets from a same backup. For example, data packets 502a-502c can correspond to the same data object and can be backed up in sequence (within their own set). In parallel to the set of data packets 502a-502c, data packets 504a-504c can be backed up in sequence (within their own set), and data packets 506a-506c can be backed up in sequence (within their own set). The data packets 502a-502c, 504a-504c, and 506a-506c can correspond, for example, to an overall backup 402 shown in FIG. 4. The use of the data packets can reduce the likelihood of needing to restart a backup from the beginning such as after a network interruption occurs after partial completion of a large backup. Further, the use of the data packets can overcome performance issues that can occur when there is otherwise only a single connection for one entire backup stream. In some implementations, tests can be performed in order to detect optimal sizes of data packets, and the optimal sizes can vary based on time-of-day (for example, depending on how busy resources are).

Figure 6:
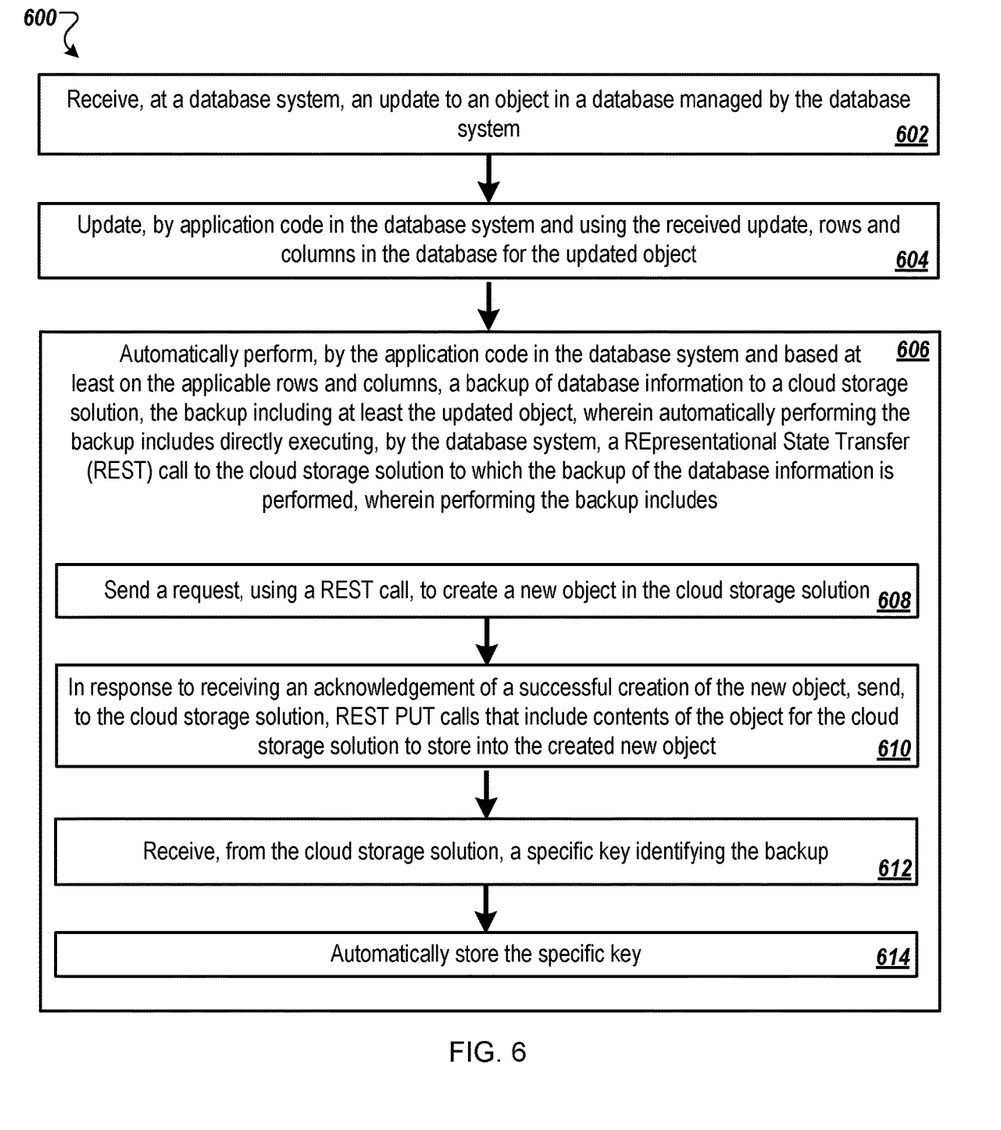
FIG. 6 is a flowchart of an example method for performing automatic backups to the cloud.

FIG. 6 is a flowchart of an example method 600 for performing automatic backups to the cloud. Method 600 can be performed by the database system 102. For clarity of presentation, the description that follows generally describes method 600 in the context of FIGS. 1-5.

At 602, an update to an object in a database managed by the database system is received at the database system. For example, the database system 102 can receive one or more database updates 110 from the client 112.

At 604, rows and columns in the database for the updated object are updated by application code in the database system using the received update. For example, the standard database operations 122 can update the tables 126 using the received database updates 110.

At 606, a backup of database information to a cloud storage solution is automatically performed by the application code in the database system based at least on the applicable rows and columns. The backup can include at least the updated object. Automatically performing the backup can include directly executing, by the database system, a REST call to the cloud storage solution to which the backup of the database information is performed. For example, the backup processes 120 can initiate a backup to the cloud storage 106 using backups 104. In some implementations, performing the backup includes steps 608-614.

In some implementations, performing the backup can include dividing the database object into portions that are operable to be processed in parallel, such as described with reference to FIG. 5. Then, the database system 102 can directly execute, in parallel for each particular portion of database object, a REST call to the cloud storage solution for the particular portion of the databased object.

At 608, a request is sent, using a REST call, to create a new object in the cloud storage solution. For example, an initial backup 104 message can include a request to create a container object in cloud storage 106 for the data object to be backed up.

At 610, in response to receiving an acknowledgement of a successful creation of the new object, REST PUT calls can be sent to the cloud storage solution that include contents of the object for the cloud storage solution to store into the created new object. The database system 102, for example, can receive an acknowledgement from the cloud storage 106 that the creation of the new object container by the cloud storage 106 has succeeded. Then, backup processes 120 can execute one or more REST PUTs to send the contents of the data being backed up to the cloud storage 106.

At 612, a specific key identifying the backup is received from the cloud storage solution. As an example, the cloud storage 106 can provide the ETag corresponding to the backup to the database system 102.

At 614, the specific key is stored locally. For example, the database system 102 can store the unique key, including storing a name and an ETag corresponding to the backup.

In some implementations, the method 600 can further include performing, by the database system, a recovery of the backed-up information. For example, the database system 102 can identify a recovery need or request for the backed-up information. In response to identifying the recovery need or request, the database system 102 can identify an identifier associated with the backed-up information. The database system 102 can provide, using a REST call sent to the cloud storage 106, a request for the backed-up information. The request can include the identifier associated with the backed-up information. The database system 102 can receive, from the cloud storage 106 in a response to the request, the backup of the database information. The database system 102 can update the tables 126 using the received response.

Figure 7:
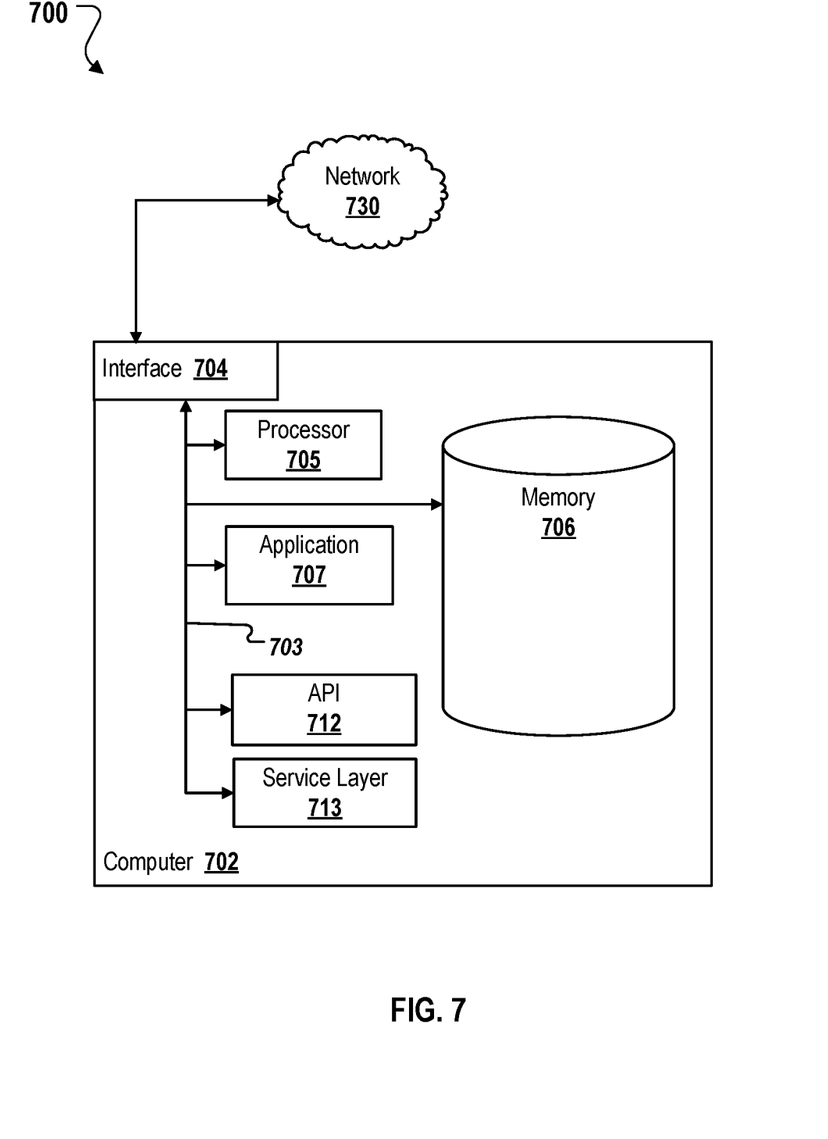
FIG. 7 is a block diagram of an exemplary computer system used to provide computational functionalities associated with described algorithms, methods, functions, processes, flows, and procedures as described in the instant disclosure.

FIG. 7 is a block diagram of an exemplary computer system 700 used to provide computational functionalities associated with described algorithms, methods, functions, processes, flows, and procedures as described in the instant disclosure.

The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a graphical user interface (GUI).

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, business intelligence (BI) server, or other server (or a combination of servers).

The computer 702 can receive requests over network 730 from a client application (for example, executing on another computer 702) and responding to the received requests by processing the said requests in an appropriate software application. In addition, requests may also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 703. In some implementations, any or all of the components of the computer 702, both hardware or software (or a combination of hardware and software), may interface with each other or the interface 704 (or a combination of both) over the system bus 703 using an API 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined business functionalities through a defined interface. For example, the interface may be software written in JAVA, C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of the instant disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems in a distributed environment that are connected to the network 730 (whether illustrated or not). Generally, the interface 704 comprises logic encoded in software or hardware (or a combination of software and hardware) and operable to communicate with the network 730. More specifically, the interface 704 may comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a memory 706 that holds data for the computer 702 or other components (or a combination of both) that can be connected to the network 730 (whether illustrated or not). For example, memory 706 can be a database storing data consistent with this disclosure. Although illustrated as a single memory 706 in FIG. 7, two or more memories may be used according to particular needs, desires, or particular implementations of the computer 702 and the described functionality. While memory 706 is illustrated as an integral component of the computer 702, in alternative implementations, memory 706 can be external to the computer 702.

The application 707 is an algorithmic software engine providing functionality according to particular needs, desires, or particular implementations of the computer 702, particularly with respect to functionality described in this disclosure. For example, application 707 can serve as one or more components, modules, applications, etc. Further, although illustrated as a single application 707, the application 707 may be implemented as multiple applications 707 on the computer 702. In addition, although illustrated as integral to the computer 702, in alternative implementations, the application 707 can be external to the computer 702.

There may be any number of computers 702 associated with, or external to, a computer system containing computer 702, each computer 702 communicating over network 730. Further, the term "client," "user," and other appropriate terminology may be used interchangeably as appropriate without departing from the scope of this disclosure. Moreover, this disclosure contemplates that many users may use one computer 702, or that one user may use multiple computers 702.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a GUI. The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
   receiving, at a first physical site of a first entity that includes a first database system, an update to an object in a database managed by the first database system;
   updating, by application code in the first database system and using the received update, rows and columns in the database for the updated object; and
   automatically causing an immediate performance, in response to receiving the update to the object, by the application code in the first database system and based at least on the applicable rows and columns, of a backup of database information over a network directly to a cloud storage solution without opening a backup file in a local file system, the backup including at least the updated object, wherein automatically performing the backup includes directly executing, by the database system, a REpresentational State Transfer (REST) call to the cloud storage solution to which the backup of the database information is performed such that data is only copied once during the backup, wherein performing the backup includes:
      sending a request, using a REST call, to create a new object in the cloud storage solution;
      in response to receiving an acknowledgement of a successful creation of the new object, sending, to the cloud storage solution, REST PUT calls that include contents of the object for the cloud storage solution to store into the created new object;
      receiving, from the cloud storage solution, a specific key identifying the backup;
      locally storing the specific key at the first database system; and
      automatically causing to perform, in response to creation of the new object in the cloud storage system, at a second physical site of the first entity that includes a second database system, a replication operation to the second database system from the cloud storage solution, to replicate the update to the object in the first database system to a corresponding object in the second database system, wherein the first physical site is a different physical site of the first entity than the second physical site.

2. The computer-implemented method of claim 1, further comprising:
   performing, by the first database system, a recovery of the backed-up information, the performing comprising:
      identifying a recovery need or request for the backed-up information;
      in response to identifying the recovery need or request, identifying an identifier associated with the backed-up information;
      providing, to the cloud storage solution and using a REST call, a request for the backed-up information, the request including the identifier associated with the backed-up information;
      receiving, from the cloud storage solution in a response to the request, the backup of the database information; and
      updating the first database system using the received response.

3. The computer-implemented method of claim 1, wherein performing the backup comprises:
   dividing the database object into portions that are operable to be processed in parallel; and
   directly executing, by the first database system and in parallel for each particular portion of database object, a REST call to the cloud storage solution for the particular portion of the databased object.

4. The computer-implemented method of claim 1, further comprising receiving, from the cloud storage solution upon a successful backup at the cloud storage solution, a key that uniquely identifies the backup.

5. The computer-implemented method of claim 4, further comprising storing the unique key by the first database system in the database, wherein storing the unique key includes storing a name and an entity tag (ETag).

6. The computer-implemented method of claim 1, wherein the first database system is an in-memory database system.

7. The computer-implemented method of claim 2, wherein the request specifies a particular ETag of a dataset to be restored.

8. A system comprising:
  memory storing:
    tables storing data used by a first database system; and
    a cloud storage index identifying data of the first database system that has been backed up to the cloud; and
  a server performing operations comprising:
    receiving, at the first database system, an update to an object in a database managed by the first database system;
    updating, by application code in the first database system and using the received update, rows and columns in the database for the updated object; and
    automatically causing an immediate performance, in response to receiving the update to the object, by the application code in the first database system and based at least on the applicable rows and columns, of a backup of database information over a network directly to a cloud storage solution without opening a backup file in a local file system, the backup including at least the updated object, wherein automatically performing the backup includes directly executing, by the database system, a REpresentational State Transfer (REST) call to the cloud storage solution to which the backup of the database information is performed such that data is only copied once during the backup, wherein performing the backup includes:
      sending a request, using a REST call, to create a new object in the cloud storage solution;
      in response to receiving an acknowledgement of a successful creation of the new object, sending, to the cloud storage solution, REST PUT calls that include contents of the object for the cloud storage solution to store into the created new object;
      receiving, from the cloud storage solution, a specific key identifying the backup;
      locally storing the specific key at the first database system; and
      automatically causing to perform, in response to creation of the new object in the cloud storage system, at a second physical site of the first entity that includes a second database system, a replication operation to the second database system from the cloud storage solution, to replicate the update to the object in the first database system to a corresponding object in the second database system, wherein the first physical site is a different physical site of the first entity than the second physical site.

9. The system of claim 8, the operations further comprising:
  performing, by the first database system, a recovery of the backed-up information, the performing comprising:
    identifying a recovery need or request for the backed-up information;
    in response to identifying the recovery need or request, identifying an identifier associated with the backed-up information;
    providing, to the cloud storage solution and using a REST call, a request for the backed-up information, the request including the identifier associated with the backed-up information;
    receiving, from the cloud storage solution in a response to the request, the backup of the database information; and
    updating the first database system using the received response.

10. The system of claim 8, wherein performing the backup comprises:
  dividing the database object into portions that are operable to be processed in parallel; and
  directly executing, by the first database system and in parallel for each particular portion of database object, a REST call to the cloud storage solution for the particular portion of the databased object.

11. The system of claim 8, the operations further comprising receiving, from the cloud storage solution upon a successful backup at the cloud storage solution, a key that uniquely identifies the backup.

12. The system of claim 11, the operations further comprising storing the unique key by the first database system in the database, wherein storing the unique key includes storing a name and an ETag.

13. The system of claim 8, wherein the first database system is an in-memory database system.

14. The system of claim 9, wherein the request specifies a particular ETag of a dataset to be restored.

15. A non-transitory computer-readable media encoded with a computer program, the program comprising instructions that when executed by one or more computers cause the one or more computers to perform operations comprising:
  receiving, at a first physical site of a first entity that includes a first database system, an update to an object in a database managed by the first database system;
  updating, by application code in the first database system and using the received update, rows and columns in the database for the updated object; and
  automatically causing to perform, by the application code in the first database system, in response to the received update and based at least on the applicable rows and columns, an immediate backup of database information to a cloud storage solution, the backup including at least the updated object, wherein automatically performing the backup includes directly executing, by the first database system, a REST call to the cloud storage solution to which the backup of the database information is performed, wherein performing the backup includes:
    sending a request, using a REST call, to create a new object in the cloud storage solution;
    in response to receiving an acknowledgement of a successful creation of the new object, sending, to the cloud storage solution, REST PUT calls that include contents of the object for the cloud storage solution to store into the created new object;
    receiving, from the cloud storage solution, a specific key identifying the backup;
    locally storing the specific key at the first database system; and automatically causing to perform, in response to creation of the new object in the cloud storage solution, at a second physical site of the first entity that includes a second database system, a replication operation to the second database system from the cloud storage solution, to replicate the update to the object in the first database system to a corresponding object in the second database system, wherein the first physical site is a different physical site of the first entity than the second physical site.

16. The non-transitory computer-readable media of claim 15, the operations further comprising:

performing, by the first database system, a recovery of the backed-up information, the performing comprising:

identifying a recovery need or request for the backed-up information;

in response to identifying the recovery need or request, identifying an identifier associated with the backed-up information;

providing, to the cloud storage solution and using a REST call, a request for the backed-up information, the request including the identifier associated with the backed-up information;

receiving, from the cloud storage solution in a response to the request, the backup of the database information; and updating the first database system using the received response.

17. The non-transitory computer-readable media of claim 15, wherein performing the backup comprises:

dividing the database object into portions that are operable to be processed in parallel; and directly executing, by the first database system and in parallel for each particular portion of database object, a REST call to the cloud storage solution for the particular portion of the databased object.

18. The non-transitory computer-readable media of claim 15, the operations further comprising receiving, from the cloud storage solution upon a successful backup at the cloud storage solution, a key that uniquely identifies the backup.

19. The non-transitory computer-readable media of claim 18, the operations further comprising storing the unique key by the first database system in the database, wherein storing the unique key includes storing a name and an ETag.

20. The non-transitory computer-readable media of claim 15, wherein the first database system is an in-memory database system.

* * * * *